May 29, 1945.　　　A. O. GROOMS　　　2,376,913
REFRIGERATING APPARATUS
Filed Nov. 16, 1940　　　3 Sheets-Sheet 1
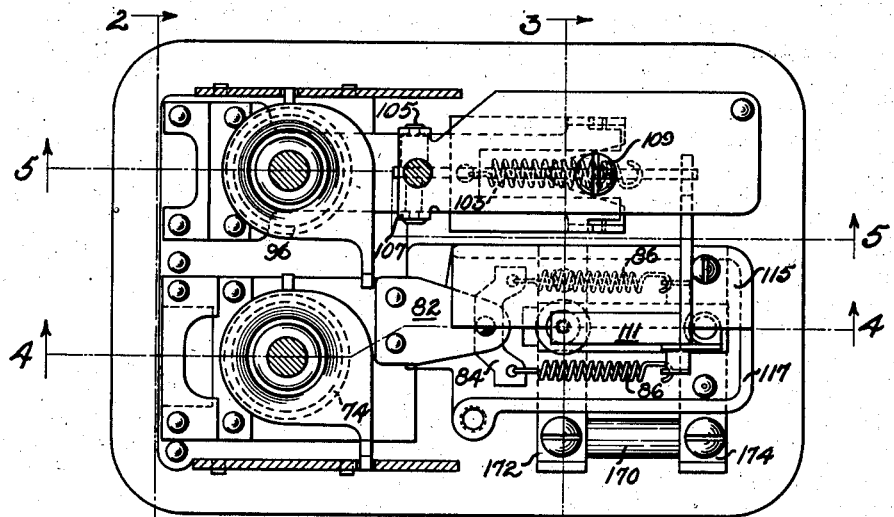
Fig. 1
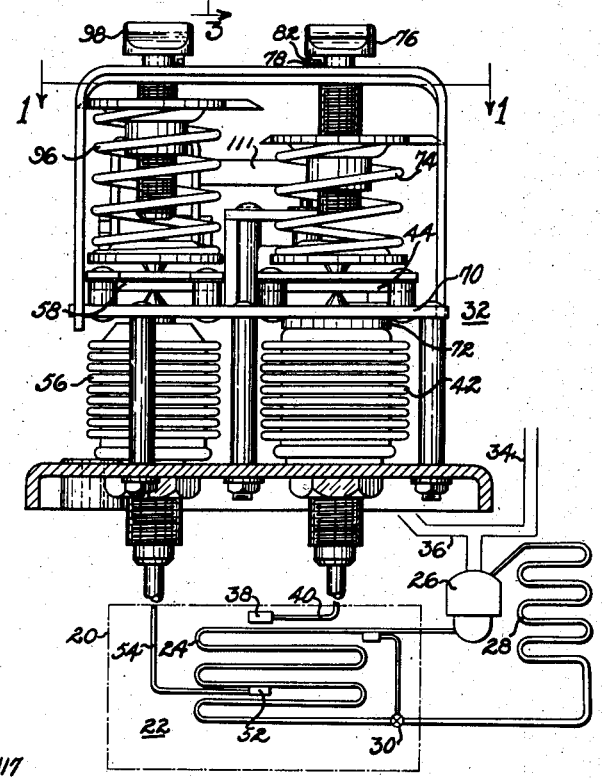
Fig. 2
Fig. 3
INVENTOR.
Albert O Grooms
BY Spencer Hardman and Fehr
ATTORNEYS

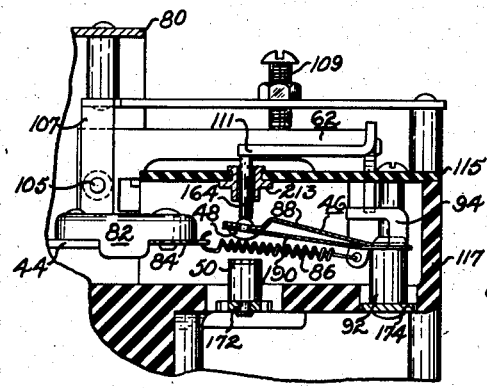
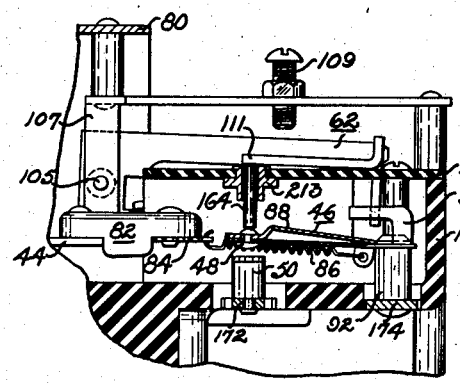
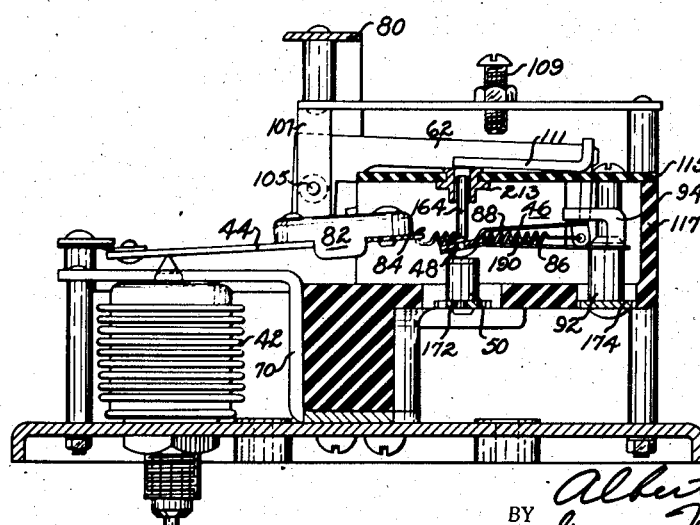

Patented May 29, 1945

2,376,913

UNITED STATES PATENT OFFICE 2,376,913

REFRIGERATING APPARATUS

Albert O. Grooms, Dayton, Ohio, assignor to General Motors Corporation, Dayton, Ohio, a corporation of Delaware Application November 16, 1940, Serial No. 366,001

8 Claims. (Cl. 62—4)

This invention relates to refrigerating apparatus and more particularly to means for cyclically controlling a refrigerating system according to evaporator temperature and box temperature.

In ordinary refrigerating practice the evaporator is ordinarily placed within a compartment surrounded by insulated walls. It has been customary to control the operation of the refrigerating system by evaporator temperature. This does not take into account the varying temperatures outside of the insulated compartment. I propose to start the refrigeration cycle when the evaporator temperature reaches a temperature just above freezing in order to defrost the evaporator and to stop the refrigeration cycles when the air or the medium cooled by the evaporator reaches a predetermined low temperature. In this way defrosting is assured every cycle and also the maintenance of proper air temperatures is also assured. I have found that controls heretofore made for such purposes do not depend solely upon such temperatures and have been difficult to adjust and must be placed within the compartment if the temperatures outside the compartment are likely to fall below the temperature which it is desired to maintain within the compartment.

It is an object of my invention to provide a control for starting refrigeration in an evaporator solely according to evaporator temperature and stopping refrigeration solely according to the temperature of the medium cooled by the evaporator in which the adjustment for both temperatures is easily made.

It is another object of my invention to provide such a control in which all of the adjustments can be accurately made with a minimum of difficulty.

It is still another object of my invention to provide such a control in which a toggle mechanism is provided for the control of each thermal operating means.

It is still another object of my invention to provide a control which may be placed either within or without the compartment to be cooled regardless of relative external temperatures.

It is another object of my invention to provide a control in which one operating means is connected through snap acting means directly to the device to be controlled while a second operating means acts through a second snap acting mechanism to operate the device and/or the first snap acting means.

Further objects and advantages of the present invention will be apparent from the following description, reference being had to the accompanying drawings, wherein a preferred form of the present invention is clearly shown.

In the drawings:

Fig. 1 is a sectional view of the control with the cover removed, taken along the line 1—1 of Fig. 2;

Fig. 2 is a sectional view taken along the line 2—2 of Fig. 1, together with a diagrammatic illustration of an appropriate refrigerating system;

Fig. 3 is a fragmentary sectional view taken along the line 3—3 of Fig. 1;

Fig. 6 is a sectional view of a modified form of the invention taken along the line corresponding to the line 4—4 of Fig. 1;

Fig. 7 is a sectional view similar to Fig. 6 showing the switch after a defrosting evaporator temperature has been reached; and Fig. 8 is a sectional view similar to Figs. 6 and 7 but also including the operating bellows showing the switch just after it has closed.

Figure 4:
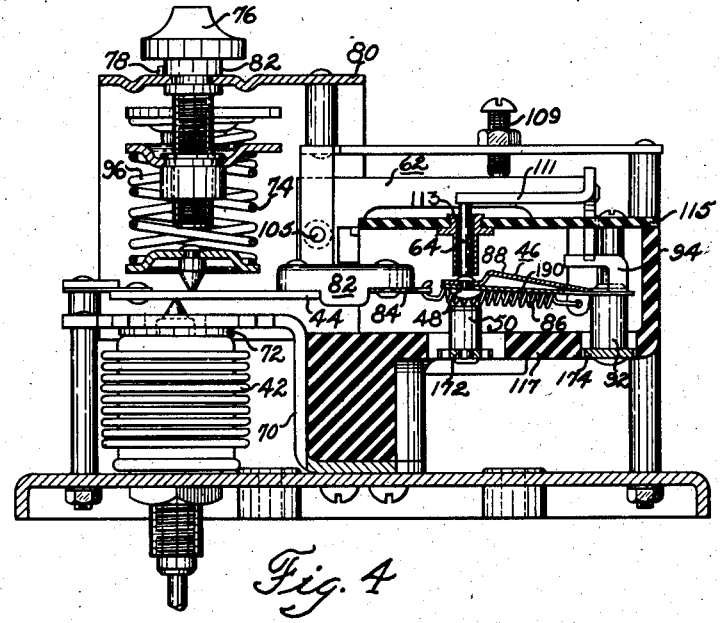
Fig. 4 is a sectional view taken along the line 4—4 of Fig. 1.
Figure 5:
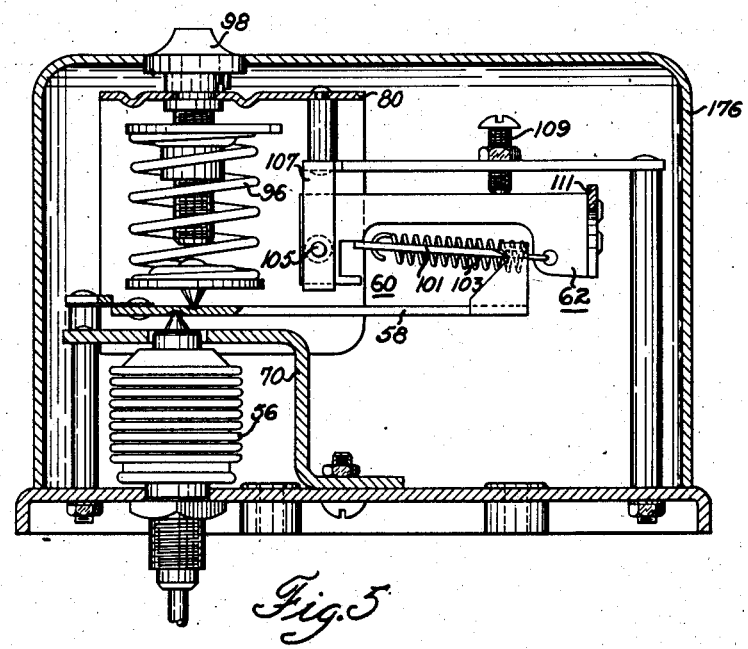
Fig. 5 is a sectional view taken along the line 5—5 of Fig. 1, but including a cover which is normally provided.

Briefly, I have shown a refrigeration switch having one bellows, snap acting mechanism, and switch contacts operated in accordance with the air temperature within an insulated compartment, while a second bellows responsive to evaporator temperature acts through a separate snap acting mechanism directly upon the switch contacts, controlled by the first bellows, in order to close the switch. An electric heater is provided within the cover so as to heat the switch in order to prevent condensation therein so that the switch may be placed anywhere and the control according to the evaporator and box temperature will always be maintained. As further insurance sufficient volatile liquid is provided in each charged system to more than fill any of the tubing which may be exposed outside the compartment 20.

Referring now to the drawings and more particularly to Fig. 2 there is shown an insulated compartment designated diagrammatically by the dot and dash outline 20 enclosing a compartment 22 containing a medium to be cooled. Such a medium may be a liquid or more commonly it will be the air in a refrigerated storage compartment. An evaporator 24 is placed within the compartment for cooling the air. This evaporator is supplied with liquid refrigerant by a sealed motor compressor unit 26 which withdraws evaporated refrigerant from the evaporator 24 and forwards compressed refrigerant to a condenser 28 where it is liquefied and returned to the evaporator 24 under the control of a suitable thermostatic automatic expansion valve 30 having a thermostat bulb mounted upon the evaporator outlet.

In order to operate the evaporator 24 below freezing temperatures and yet keep it free from any material amount of frost I provide a switch 32 in series with conductors 34 and 36 connecting to the motor-compressor unit. This switch is so constructed that it will not close until the evaporator reaches a temperature just above defrosting, such as 33° F. In order to control the temperature of the air within compartment 22 more closely, my switch does not open to stop operation of the system until a predetermined low air temperature such as 36° F. is attained within the compartment 22.

This switch includes a charged system including a thermostat bulb 38 mounted in the air in the upper part of the compartment 22 so that it is subject to the temperature of the air in a most vital point in the compartment. Any location is suitable which satisfactorily reflects the general temperature of the air in the compartment. This bulb 38 is connected by tubing 40 to the main operating bellows 42 which is connected by the primary lever 44 to a snap acting mechanism 46 carrying the movable contact 48 for making engagement with the stationary contact post 50. A second charged system includes a second thermostat bulb 52 mounted upon the evaporator preferably at the point at which the frost disappears last. This second bulb 52 is connected by capillary tubing 54 with the auxiliary operating bellows 56. This auxiliary operating bellows 56 is connected through the primary lever 58 with a snap acting mechanism 60 connecting to a pivoted arm 62. This pivoted arm 62 is provided with an arm 111 which, through a pin 64, operates the movable contact 48 from open to closed position. While I have shown the bulbs 38 and 52 as enlarged portions at the end of the tubing 40 and 54 it should be understood that ordinarily these bulbs will merely be the end portion of the capillary tubing without any form of enlargement.

The main operating bellows 42 is confined within an L-shaped bellows stop 70 provided with a washer 72 for limiting the expansion of the bellows 42. This expansion is so limited by the washer 72 that the bellows 42 cannot move the primary lever 44 in a counter-clockwise direction sufficiently to move the snap acting mechanism 46 across its dead-center position to close the contacts 48 and 50. However, when the contacts 48 and 50 are in a closed position the bellows 42 can contract to move the primary lever 44 in a clockwise direction to operate the snap acting mechanism 46 across its dead-center position to open contacts 48 and 50.

This operation is controlled by the compression coil spring 74 which acts upon the primary lever 44 in order to oppose the expansion of the bellows 42. The tension of this spring is adjusted by an adjusting screw which is provided with an adjusting knob 76, normally limited to one revolution of rotation by the pin 78 provided upon the spring supporting structure 80 in order to engage the projection 82 upon the knob 76. This is more clearly indicated in Fig. 2.

The primary lever 44 is provided with a section 82 of insulating material at its free end provided with a metal connector plate 84. This connector plate 84 connects to one end of each of a pair of tension toggle springs 86 forming a part of the snap acting mechanism 46. The other end of each of the springs 86 connect to ears formed at one end of a rigid toggle member 88 having its other end riveted by the contact 48 to the adjacent end of a flexible strip 190. This strip 190 has its opposite end riveted to the post 92 just beyond the ears previously mentioned. This post 92 is also provided with an arm 94 for limiting the upward movement of the rigid member 88 while the downward movement of the rigid member 88 is limited by the strip 190.

In Fig. 4, the switch is shown plainly in the open position. The bellows 42 is expanded as far as possible because of the washer 72 and the stop member 70. It is evident therefore that the air temperature within the compartment 22 cannot cause the operation of the snap acting mechanism 46 to close the contacts 48 and 50. Therefore this is positive insurance that the switch can only be closed by evaporator temperature acting through the auxiliary bellows 56.

This auxiliary bellows 56 is opposed by a compression type coil spring 96 which has its tension adjusted by the adjusting screw and knob 98, limited to one revolution of normal movement by a pin and projection like those described for the knob 76. Normally this knob 98 is so adjusted that a temperature of 33° must be reached by the evaporator 24 in the vicinity of the bulb 52 before the snap acting mechanism 60 can be operated. This snap acting mechanism 60 is connected to the primary lever 58 by the secondary lever 101 which has knife edges at one end held within notches provided at the adjacent end of the primary lever 58. The other end of this secondary lever 101 is connected by a tension toggle spring 103 with the lever 62 which is pivoted upon a pin 105 to a supporting frame 107. The counter-clockwise movement of lever 62 is adjusted by the adjusting screw 109. The arm 62 is provided with a projecting arm 111 which extends over and contacts the upper end of the operating pin 64. This operating pin 64 is slidably mounted within a bushing 113 which is fixed within the top plate 115 of the contact chamber which is enclosed by the insulating member 117. This operating pin 64 forms a lost motion connection between the arm 62 and contact 48.

When the evaporating means 24 reaches a temperature of 33° F., for example, the pressure within the auxiliary bellows 56 will overcome the force of the spring 96 and the snap acting mechanism 60 so that the lever 62 is pivoted in a clockwise direction away from its stop screw 109. The end of the projecting arm 111 upon the lever 62 pushes the pin 64 downwardly in order to move the contact 48 down into engagement with the contact post 50 and to throw the snap acting toggle mechanism 46 across its dead-center position. This will cause the starting of the motor compressor unit and thus will start a refrigerating cycle. The differential of the snap acting mechanism 60 is made sufficiently small so that during the refrigeration cycle, the arm 62 is returned to its position against the lower end of the stop screw 109 prior to the time that the air temperature within the compartment 22 reaches the point at which the main bellows 42 will operate the snap acting mechanism 46 to open contacts 48 and 50. This refrigerating cycle will continue until the temperature in the compartment reaches the proper temperature such as 36° F. at which it is desired that refrigeration should stop. Thus it is evident that the starting of the cycle depends solely upon evaporator temperature and the stopping of the cycle depends wholly upon air temperature.

In Figs. 6, 7 and 8 I have shown a modified form of the invention by which with a small change, the control can be made to operate so that the refrigerating cycle is not started until the air within the compartment 22 reaches a predetermined high temperature, such as 39° F., and also the evaporator 24 reaches a predetermined high temperature, such as 33° F., for example. In this modification, the only changes are the shortening of the bushing 113 to the length shown in Fig. 6 in the bushing designated as 213 and the shortening of the pin 64 by approximately one-sixteenth of an inch. In Fig. 6 the shortened pin is designated by the reference character 164. Also, in this modification it is necessary to remove the washer 72 in order to allow full movement of the bellows 42. In all other respects the modification shown in Figs. 6, 7 and 8 is the same as modifications shown in Figs. 1 to 5 and the unchanged parts bear the same reference characters.

Fig. 6 shows the switch immediately after the bellows 42 has contracted sufficiently to cause the primary lever 44 to move in a clockwise direction sufficiently to trip the contacts 48 and 50 to open position. It should be noted that the movement of the snap acting mechanism 46 and particularly the contact 48 is greater by the amount of shortening of the operating pin, which is about one-sixteenth of an inch. Since the pin has been shortened, the operation of the auxiliary bellows 56 and its snap action mechanism 60 causing the movement of the arm 62, as shown in Fig. 7, alone is not sufficient to move the contact 48 into engagement with the contact post 50 or to trip the snap acting mechanism 46. Also it is evident that the primary lever 44 cannot be moved far enough from its position in Fig. 6 in order to trip the toggle mechanism 46 as long as the arm 62 remains against its stop screw 108 as shown in Fig. 6. However, when the bellows 42 is sufficiently expanded and the auxiliary mechanism has tripped to push the pin 164 downwardly as shown in Fig. 7, the toggle snap acting mechanism 46 will be tripped to close the contacts 48 and 50 as shown in Fig. 8. Thus in this type of control a certain box temperature as well as a certain evaporator temperature is required for the starting of each refrigeration cycle. This is an additional precaution to prevent the air within the compartment 22 from becoming too cold.

In order to prevent the bellows 42 and the bellows 56 from becoming colder than their bulbs 38 and 52, I have provided an electric heater 170 which is connected across the connecting terminals 172 and 174 which respectively are riveted to the bottoms of the posts 50 and 92 and to the bottom of the insulated contact box 117. These posts 50 and 92 extend from the terminals 172 and 174 upwardly through apertures in an insulated contact box 117. The cover 176 encloses the entire switch mechanism and confines the heat provided by the electric heater 170. This heater operates when the contacts are open but only uses a very small amount of current. This is sufficient to prevent condensation within the bellows 42 and 56. It also prevents corrosion of the switch mechanism. In addition the charged systems including the bulbs are charged with sufficient volatile liquid to more than fill the exposed connecting portion of the capillary tubing 40 and 54 so that all condensation will be subject to the temperature of the bulb portions 38 and 52. This insures that the operation of the switch will always be in accordance with the temperature of the bulb portions 38 and 52. Any suitable volatile liquid may be used.

While I have decribed this control as employed for controlling the motor-compressor unit in a refrigerating system having an evaporator means for cooling the air within an insulated compartment, it should be understood that the invention is not limited to this system but that this system is merely used for illustrative purposes. If desired, this control may be used to control an electrically operated valve located at the inlet or outlet of the evaporating means, and the evaporating means may be used to cool any sort of medium at any desired temperatures whenever it is desired to control the system according to both the temperature of the medium and evaporator temperature.

While the form of embodiment of the invention as herein described, constitutes a preferred form, it is to be understood that other forms might be adopted, all coming within the scope of the claims which follow.

What is claimed is as follows:

1. Refrigerating apparatus including cooling means for cooling a medium, means for circulating a refrigerating fluid through the cooling means, control means for controlling the starting and stopping of the circulation of refrigerating fluid, operating means responsive to the temperature of the medium and having a connection at all times with said control means, and an auxiliary means responsive to the temperature of said cooling means and having a lost motion connection with said control means.

2. Refrigerating apparatus including cooling means for cooling a medium, means for circulating a refrigerating fluid through the cooling means, control means for controlling the starting and stopping of the circulation of refrigerating fluid, an operating means responsive to the temperature of said medium, snap acting means connecting said operating means and said control means, an auxiliary means responsive to the temperature of said cooling means, and a lost motion connection between said auxiliary means and said control means.

3. Refrigerating apparatus including cooling means for cooling a medium, means for circulating a refrigerating fluid through the cooling means, control means for controlling the starting and stopping of the circulation of refrigerating fluid, an operating means responsive to the temperature of said medium, snap acting means connecting said operating means and said control means, an auxiliary means responsive to the temperature of said cooling means, a second snap acting means connected to said auxiliary means, and a lost motion connection between said second snap acting means and said control means for causing the second snap-acting means to operate said control means.

4. Refrigerating apparatus including cooling means for cooling a medium, means for circulating a refrigerating fluid through the cooling means, control means for controlling the starting and stopping of the circulation of refrigerating fluid, an operating means responsive to the temperature of said medium, snap acting means connecting at all times said operating means and said control means, an auxiliary means responsive to the temperature of said cooling means for operating said control means, and means for preventing at all times the movement of the control means in one direction by the operating means.

5. Refrigerating apparatus including cooling means for cooling a medium, means for circulating a refrigerating fluid through the cooling means, control means for controlling the starting and topping of the circulation of refrigerating fluid, an operating means responsive to the temperature of said medium, snap acting means connecting at all times said operating means and said control means, an auxiliary means responsive to the temperature of said cooling means for operating said control means, and means for preventing at all times the movement of the control means in one direction by the auxiliary means.

6. Refrigerating apparatus including an insulated compartment containing a medium to be cooled, cooling means in heat exchange relation with the medium to be cooled, means for circulating a refrigerant medium through the cooling means, control means for said circulating means, said control means having a charged system including a fluid motor operating means located outside said insulated compartment and tubular means extending from said fluid motor into said compartment, said control means being provided with heating means sufficient to prevent condensation within said fluid motor, said charged system being charged with sufficient volatile liquid to more than fill the portion of said tubular means exposed outside said insulated compartment.

7. A control including a first operating means, a device to be operated, snap acting means operatively connecting said operating means and said device, a second operating means, a second snap acting means operatively connected to said second operating means, and means operatively connected to and operated by said second snap acting means for moving said device.

8. A control including a first operating means, a device to be operated, snap acting means operatively connecting said operating means and said device, a second operating means, a second snap acting means operatively connected to said second operating means, means operatively connected to and operated by said second snap acting means for moving said device, spring means for controlling said first operating means, spring means for controlling the second operating means, and means for independently adjusting said spring means.

ALBERT O. GROOMS.